United States Patent
Demirel et al.

(10) Patent No.: US 8,603,623 B2
(45) Date of Patent: Dec. 10, 2013

(54) NANOPOROUS THIN FILMS AND MULTI-FUNCTIONAL LAYERS VIA SPATIALLY ORGANIZED POLYMERS

(75) Inventors: Melik C. Demirel, State College, PA (US); Alok K Singh, Springfield, VA (US); Walter J Dressick, Waldorf, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 154 days.

(21) Appl. No.: 12/108,549

(22) Filed: Apr. 24, 2008

(65) Prior Publication Data

US 2008/0268226 A1    Oct. 30, 2008

Related U.S. Application Data

(60) Provisional application No. 60/913,574, filed on Apr. 24, 2007.

(51) Int. Cl.
*B32B 3/26* (2006.01)
*C23C 14/20* (2006.01)

(52) U.S. Cl.
USPC ............... 428/319.1; 428/315.5; 428/319.3; 428/319.7; 428/375; 977/762; 427/597; 427/443.1; 427/255.6

(58) Field of Classification Search
USPC .............. 428/315.5, 319.1, 319.3, 319.7; 977/762; 427/255.6, 443.1, 597
See application file for complete search history.

(56) References Cited

U.S. PATENT DOCUMENTS

| | | | |
|---|---|---|---|
| 5,866,204 A | 2/1999 | Robbie et al. | |
| 6,436,615 B1 | 8/2002 | Brandow et al. | |
| 2001/0039043 A1* | 11/2001 | Lihme et al. | 435/212 |
| 2002/0026086 A1 | 2/2002 | Dolbier et al. | |
| 2003/0217928 A1* | 11/2003 | Lin et al. | 205/109 |
| 2004/0146560 A1* | 7/2004 | Whiteford et al. | 424/484 |
| 2005/0265648 A1 | 12/2005 | Roitman et al. | |
| 2006/0159916 A1* | 7/2006 | Dubrow et al. | 428/357 |
| 2006/0207878 A1* | 9/2006 | Myung et al. | 204/403.09 |

(Continued)

FOREIGN PATENT DOCUMENTS

WO    2005108460 A1    11/2005

OTHER PUBLICATIONS

Boduroglu et al., "Controlling the Wettability and Adhesion of Nanostructured Poly-(p-xylxylene) Films" Langmuir, 23, 11391-11395 (Oct. 2007).

(Continued)

*Primary Examiner* — Hai Vo
(74) *Attorney, Agent, or Firm* — US Navel Research Laboratory; Joseph T. Grunkemeyer

(57) ABSTRACT

A spatially organized polymer nanostructured thin film and a ligand adsorbate attached to the polymer nanostructured thin film and, optionally, an additional material or materials attached to the ligand adsorbate. A method for forming a structure by: providing a spatially organized polymer nanostructured thin film and a ligand adsorbate, and adsorbing the ligand adsorbate onto the thin film and, optionally, binding additional material or materials to the ligand adsorbate.

26 Claims, 9 Drawing Sheets

(56) References Cited

U.S. PATENT DOCUMENTS

| | | | |
|---|---|---|---|
| 2007/0004046 A1 | 1/2007 | Abbott | |
| 2007/0042609 A1* | 2/2007 | Senkevich et al. | 438/778 |
| 2007/0099019 A1* | 5/2007 | Hanefeld et al. | 428/548 |
| 2007/0148206 A1* | 6/2007 | Demirel et al. | 424/423 |
| 2008/0269456 A1 | 10/2008 | Lahann et al. | |
| 2009/0257056 A1* | 10/2009 | Demirel et al. | 356/301 |
| 2009/0269587 A1* | 10/2009 | Dressick et al. | 428/411.1 |

OTHER PUBLICATIONS

Cetinkaya et al., "Growth of nanostructured thin films of poly(p-xylylene) derivatives by vapor deposition" Polymer, 48, 4130-4134 (2007).

Chen et al., "A Non-Covalent Approach for Depositing Spatially Selective Materials on Surfaces" Ad. Funct. Mater., 15, 1364-1375 (2005).

Demirel et al., "Fibroblast Cell Attachment and Growth on Nanoengineered Sculptured Thin Films" J. Biomed. Mater. Res. B, 81B(1), 219-223 (2007).

Demirel et al., "Noncovalent Deposition of Nanoporous Ni Membranes on Spatially Organized Poly(p-xylyene) Film Templates" Adv. Mater., 19, 4495-4499 (Dec. 2007).

Pursel et al., "Growth of sculptured polymer submicronwire assemblies by vapor deposition" Polymer, 46, 9544-9548 (2005).

Office action in U.S. Appl. No. 12/477,394 (Apr. 22, 2010).

Office action in U.S. Appl. No. 12/477,394 (Oct. 12, 2011).

Office action in U.S. Appl. No. 12/477,394 (Mar. 8, 2012).

Office Action in U.S. Appl. No. 12/430,932 (Jun. 27, 2012).

Office Action in U.S. Appl. No. 12/477,394 (Oct. 12, 2012).

Lahann et al., "Novel Poly(p-xylylenes): Thin Films with Tailored Chemical and Optical Properties" Macromolecules 2002, 35, 4380-4386.

* cited by examiner (a)

(b)

NANOPOROUS THIN FILMS AND MULTI-FUNCTIONAL LAYERS VIA SPATIALLY ORGANIZED POLYMERS

This application claims priority to U.S. Provisional Patent Application No. 60/913,574. This application and all other publications and patent documents referenced throughout this application are incorporated herein by reference.

FIELD OF THE INVENTION

The present invention relates generally to materials and methods for binding of one or more chemical species or coatings to nanostructured polymer surfaces.

DESCRIPTION OF RELATED ART

EL metallization of polymer films is typically a multi-step process[1] involving: (1) chemical/mechanical surface microroughening to promote metal adhesion; (2) adsorption of Pd/Sn core-shell colloids to the surface; (3) selective dissolution of the $Sn^{II/IV}$ β-hydroxy shell segment not anchoring the colloid to the surface to expose the catalytic $Pd^0$ core, and finally; (4) solution deposition of EL metal. For nanostructured thin films (NTFs), however, the need to minimize potential damage to film nanoarchitectures, eliminate environmentally hazardous Sn salts, and reduce process steps and costs necessitates consideration of an alternate EL plating procedure.

Nickel, due to its favorable physicochemical properties, is widely used in catalytic,[2,3] energy storage,[4,5] and optical applications.[6,7] Although nickel morphology, topology, and surface chemistry are important for these applications, their control is limited by: (1) nickel deposition conditions and treatments,[8-10] and; (2) properties and available architectures of sacrificial metallization templates,[2,7,11-14] which are usually removed by (thermo)chemical treatments after plating.

A method and system for forming and using poly(p-xylylene) films is described and set forth in U.S. Patent Application Publication 2007/0148206.

SUMMARY OF THE INVENTION

The invention comprises a structure, comprising: a spatially organized polymer nanostructured thin film; and a ligand adsorbate attached to the polymer nanostructured thin film.

The invention further comprises a method for forming a structure, the method comprising: providing a spatially organized polymer nanostructured thin film and a ligand adsorbate; and adsorbing the ligand adsorbate onto the thin film.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

Figure 1:
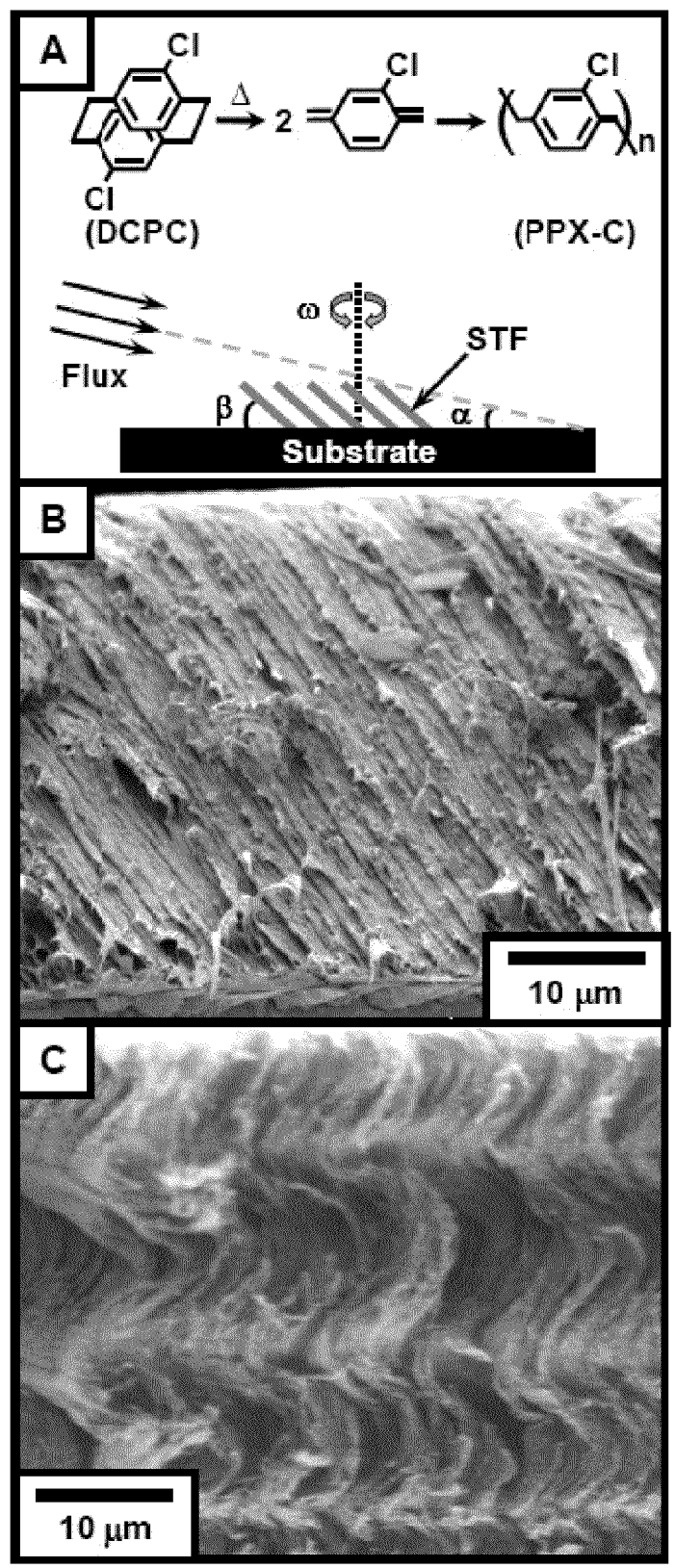
FIG. 1 shows (A) a pyrolysis reaction for formation of poly(chloro-p-xylylene) (PPX-C) from dichloro-[2.2]paracyclophane (DCPC) with schematic for fabrication of NTFs (note Methods Section); and (B) SEM cross section of columnar PPX-C NTF on Si wafer ($\alpha=10°$, $\beta=55°$, $\omega=0$ $s^{-1}$); SEM cross section of right-handed PPX-C NTF helices on Si wafer ($\alpha=10°$, $\beta=90°$, $\omega=0.1$ $s^{-1}$). The morphology of NTFs in parts (B) and (C) comprises bundled polymer strands of ~50-200 nm diameter.

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

The present disclosure relates generally to materials and methods for rapid and efficient binding of one or more chemical species or coatings to nanostructured polymer surfaces comprising functionalized poly-p-xylylene (PPX) films or copolymers thereof deposited via directed vapor-phase methods. The method and system for forming and using the PPX films is described and set forth in U.S. Patent Application Publication 2007/0148206.

Further, the present disclosure describes binding materials and processes which (i) may be carried out using safe solvents (e.g., water), (ii) may be applicable to surfaces of polymer films of average thickness greater than one monolayer (i.e., thicknesses greater than about 0.5 nm), (iii) may include non-covalent (e.g., electrostatic, van der Waals, etc.) modes for binding an initial chemical ligand species capable of subsequently optionally binding additional species or coating materials, if desired, to the surface so as not to alter the inherent chemical nature of the PPX film, and (iv) may permit preferential binding of additional chemical species to the adsorbed ligand species via non-covalent or covalent means so as to create a layered system comprising at a minimum the PPX film and non-covalently adsorbed chemical ligand species, and optionally one or more additional chemical species or coatings bonded to the chemical ligand species. One exemplary material capable of binding to a polymer film is nickel. A new method and system using poly-p-xylylene nanostructured thin films (NTFs) formed through vapor-phase polymerization and directed deposition of [2.2]paracyclophane derivatives (FIG. 1A)[15, 16] as new metallization templates has been developed.

Proper selection of the deposition geometry and conditions and the [2.2]paracyclophane derivative may permit simultaneous control of film morphology, topology, and surface chemistry, yielding NTFs having diverse, well-organized porous structures (FIGS. 1B-C). Therefore, the fabrication and characterization of nanoporous Ni membranes templated by conformal electroless (EL) metallization of poly(chloro-p-xylylene) (PPX-C) NTFs is presented as one example of an application for the present method and system. Although nickel is used as an exemplary material, the method is not limited to these specific embodiments. The present method contemplates extending this process to include materials such as, without limitation, those useful for biomedical implant, metal-dielectric composite, energy storage, Surface Enhanced Resonance-Raman Spectroscopy (SERS) platform, and/ or other similar or related applications. For example, the present method contemplates functionalization of surfaces for cell adhesion, for specific controlled drug release, tissue targeting, localized delivery, lower dose administration, and improved side effect profiles.

According to one aspect, a structure or system is provided which includes a polymer nanostructured thin film and a ligand adsorbate attached to the polymer nanostructured thin film. A nanostructured thin film includes assemblies of nanowires or submicron wires. One or more additional layers, sometimes referred to as outer layers herein, may overlay the ligand adsorbate. The method may further comprise treating the ligand adsorbate with an additional material or materials to bind the material(s) to the nanostructured thin film bearing the ligand adsorbate. The polymer nanostructured thin film may be a polymer thin film such as a poly-p-xylylene thin film having one or more functional groups. Examples of such functional groups include, without limitation, halogens, esters, ketones, amines, or lactones.[17]

The functionalized thin film may be functionalized by means of other permissible functional groups where one functional group is a Cl (chloro-p-xylylene) prepared by vapor-phase pyrolysis of dichloro-[2.2]-cyclophane. The system also includes the functionalized thin film having left or right-handed helical, columnar or chevron nanostructure, or some combination there of. This system also includes the ligand adsorbate thin film having a hydrophobic portion facilitating non-covalent absorption to the functionalized thin film, and a less hydrophobic or hydrophilic portion containing another functional group capable of covalently binding another material.

A method for forming a functionalized thin film is provided according to another aspect of the present invention. The method includes providing a polymer nanostructured thin film and a ligand adsorbate and adsorbing the ligand adsorbate onto the polymer nanostructured thin film. The ligand adsorbate may have the function of a catalyst layer or the optional other layers added later in addition to being a ligand adsorbate. In that case it would not be necessary to add any other layers or catalysts.

The method includes providing a nanoporous thin film and a ligand adsorbate and optionally one or more outer layer(s), adsorbing the ligand adsorbate onto the nanoporous thin film, and optionally bonding one or more outer layer(s) to the ligand adsorbate to thereby bind said optional outer layer(s) to the ligand adsorbate. The ligand adsorbate may be a material capable of binding a catalyst. The method may also include the step of binding a Pd catalyst to the ligand adsorbate for covalently binding the Pd catalyst to the ligand adsorbate anchored to the nanoporous thin film. The nanoporous thin film is preferably a nanostructured polymer thin film, such as, but not limited to, a poly-p-xylylene thin film. The method may include the step of contacting ligand vapors or aqueous solution containing dissolved ligand to the nanoporous thin film for absorbing the ligand adsorbate onto the nanoporous thin film. The method may also entail the step of depositing the at least one outer layer onto the ligand adsorbate or the catalyst species using a solution or a vapor of the at least one outer layer as a precursor, depositing the at least one outer layer by electroless deposition, physical vapor deposition, chemical vapor deposition, or direct contact of the solution of the precursor. The method may provide for the nanoporous thin film being sequentially treated with a metal binding ligand adsorbate, a Pd catalyst, and a solution for electrolessly depositing Ni, Cu, Co, Fe, Au, Ag, Pt, Pd, or alloys thereof to fabricate a conformal metal coating on the nanoporous thin film.

For example, it has been shown elsewhere[18-22] that solvent-templated sites tailored to adsorb catalyst-binding pyridine ligand can be created at a polymer surface during film deposition from solution. Subsequent partitioning of pyridine from aqueous solution into these sites, driven by maximization of hydrophobic van der Waals and $\pi$-$\pi$ interactions with polymer aromatic functional groups defining the sites, non-covalently binds pyridine ligand at the polymer surface. Because the hydrophilic N site of the adsorbed pyridine remains accessible to aqueous solution, covalent binding of $Pd^{II}$ EL catalysts in quantities exceeding the ~$10^{15}$ $Pd^{II}$ ions $cm^{-2}$ threshold[23] required for EL metal deposition is subsequently facilitated.

Figure 2:
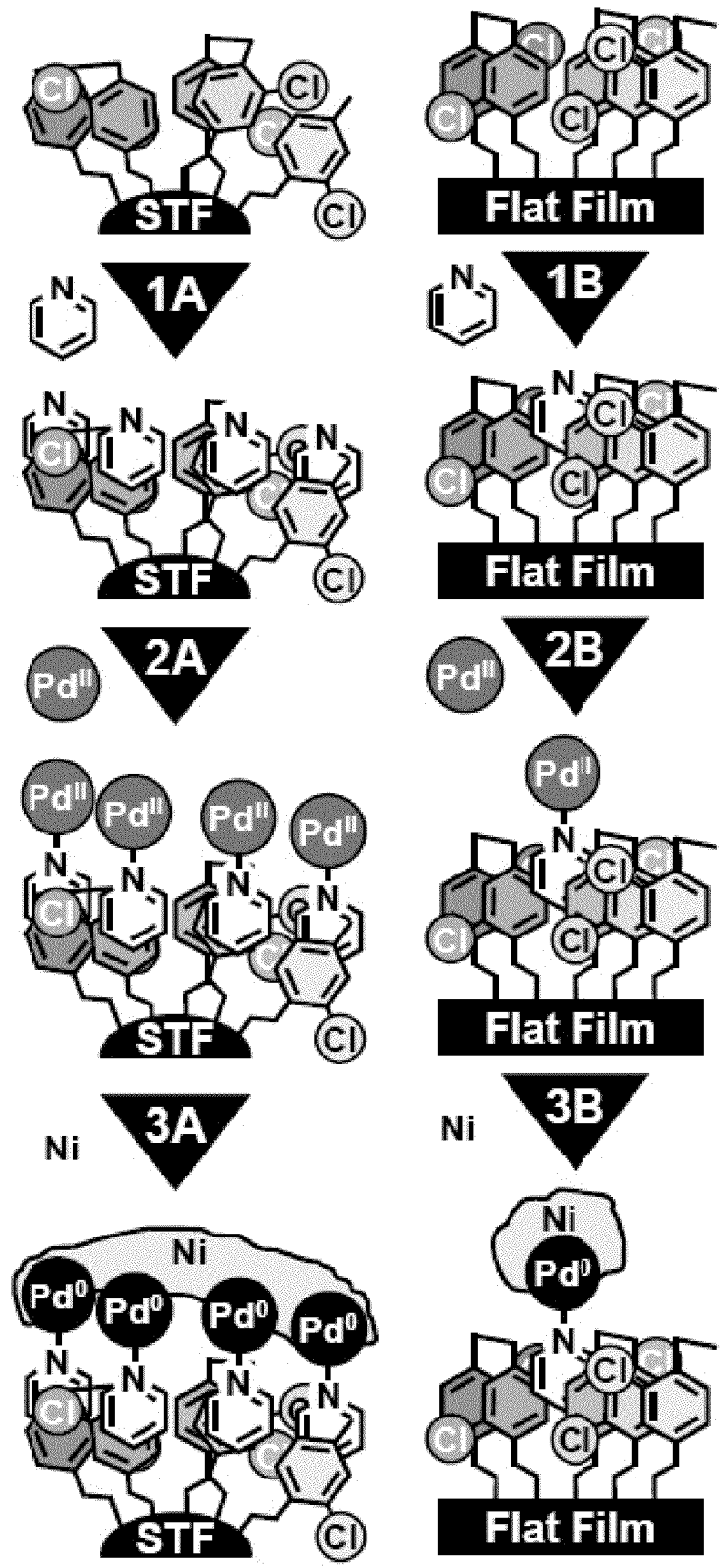
FIG. 2 shows a scheme for electroless Ni films onto poly-p-xylylene films. The process models are shown for nanostructured films (Path A) and planar films (Path B).
Figure 3:
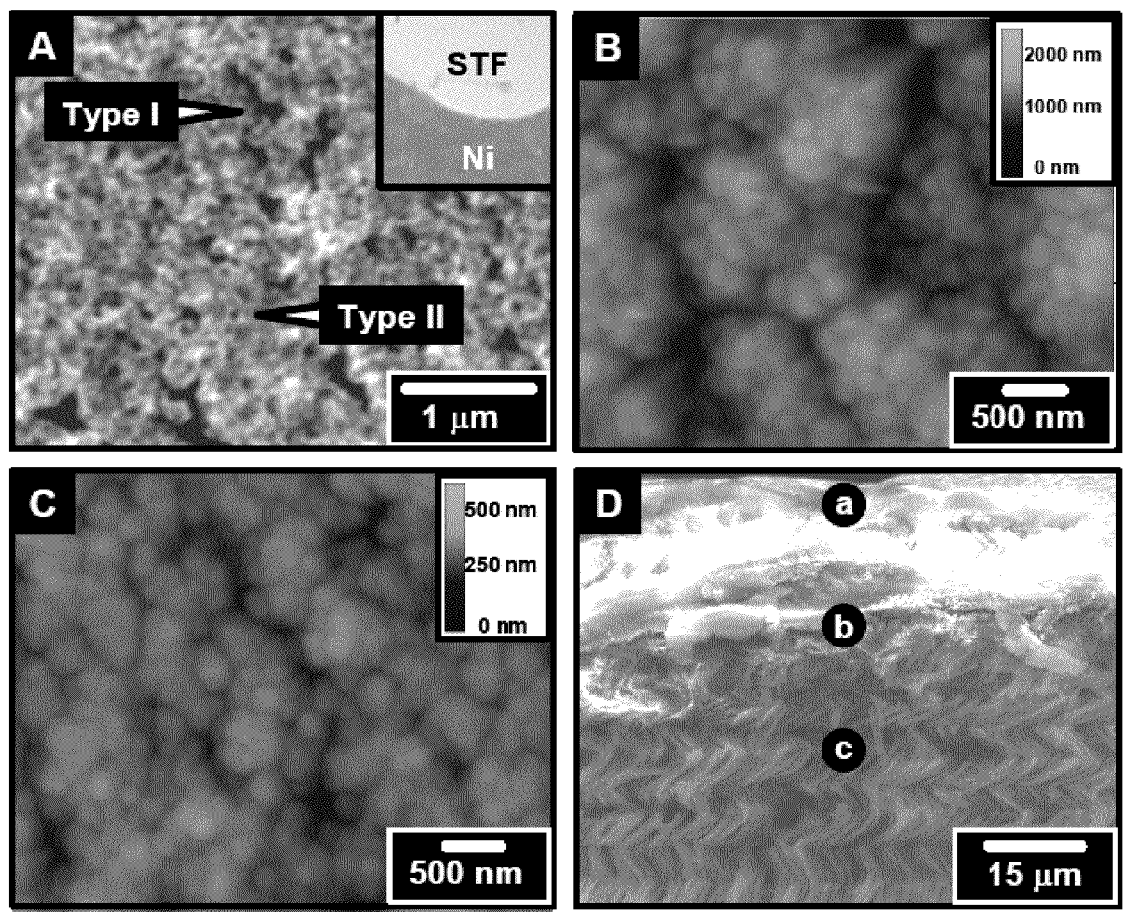
FIG. 3 shows film characterization. (A) SEM of top surface of Ni film (light areas) on a helical NTF showing bimodal distribution of pores (dark areas). Examples of larger irregular Type I and smaller nearly circular Type II pores are highlighted. Inset: Low resolution view of Ni plated helical NTF, Width of image is 1 cm; (B) Typical contact mode AFM image of the top surface of an unmetallized helical PPX-C NTF; (C) Representative contact mode AFM image of the top surface of a Ni plated helical PPX-C NTF. Image does not correspond to the same portion of the NTF as shown in part (B) above; (D) SEM cross section of Ni coated (upper light area) helical PPX-C NTF (lower gray area). Points "a" (Ni top surface), "b" (Ni-NTF interface, 20 μm depth), and "c" (unplated NTF interior, 40 μm depth) mark the areas selected for EDAX analysis in FIG. 5.

The absence of solvent during vapor-phase deposition of NTFs (FIG. 1A) precludes this mechanism as a basis for the ligand binding behavior of the systems. The mechanism responsible for ligand binding by the nanostructured polymer thin film systems described herein is currently unknown. However, a simple model shown in FIG. 2 has been developed that currently provides the best explanation of the observations. While not wishing to be bound by this model or theory, it is utilized here solely to facilitate the description of the system. As shown in FIG. 2, this model asserts that appropriate adsorption sites for pyridine ligand might be created during polymer NTF deposition by exploiting the amorphous nature of the NTF surface and the nanoscale PPX-C NTF dimensions (FIG. 1).[15, 16] In general, polymer chains comprising amorphous film surface regions are expected to provide accessible pyridine adsorption sites through formation of non-covalent ligand-polymer interactions.[18, 19] Enhanced surface disorder expected for higher surface energy (i.e., high curvature, 50-200 nm diameter) NTF polymer filaments[15, 16] is expected to provide a mechanism for more rapid adsorption of larger quantities of ligand relative to a planar PPX-C film (FIG. 2, steps 1A vs. 1B). Consequently, levels of adsorbed pyridine capable of covalently binding sufficient $Pd^{II}$ (step 2A) to initiate EL Ni deposition (step 3A) are expected to be achieved for the NTF, leading to confluent Ni plating. Such confluent Ni plating is observed by experiment, as shown in FIG. 3A, inset. II contrast, under identical treatment conditions (note Methods Section) levels of adsorbed ligand would not be expected to bind sufficient $Pd^{II}$ (step 2B) for sustained surface metallization (step 3B) of planar films and little or no Ni would be expected to deposit. In fact, experimental results show that indeed little or no Ni deposits under these conditions (~0-5% spotty Ni surface plating; not shown).

Other experimental results also support the differential ligand adsorption model of FIG. 2. For example, thermally induced changes in polymer chain conformations continually create new surface sites capable of intercepting and binding additional ligand. Consequently, in time even a planar polymer film can adsorb sufficient pyridine to promote plating. In fact, surfaces of planar PPX-C films pyridine-treated for longer times (i.e., several days) are increasingly plated, consistent with the model. Further support for the process is obtained from surface analyses of helical NTFs following each treatment. For example, a strong XPS Ni (2p) signal (not shown) observed at 852 eV identifies the material deposited on the NTF as nickel metal following completion of the process of FIG. 2. Analysis of the $Pd(3d_{5/2})$ XPS region (FIG. 4A) for a sample treated sequentially with pyridine (aq) and PD1 catalyst (note Methods Section) prior to Ni deposition reveals a $Pd^{II}$ signal (0.74 at. %) with components at 339 eV ($Pd^{II}$-N) and ~337-338 eV ($Pd^{II}$-Cl and $Pd^{II}$-O(H)) indicative of chloro/hydroxyl-bridged $Pd^{II}$ colloids covalently bound to the pyridyl N sites.[23, 24]

Important to PPX-C NTF surface treatments by PD1 catalyst and pyridine ligand is the first observation that direct adsorption of $Pd^{II}$ to the NTF surface also occurs in the absence of adsorbed ligand, in agreement with earlier observations regarding PD1 catalyst interactions with high energy surfaces.[14,25] However, the quantity of $Pd^{II}$ adsorbed (0.39 at. %) is insufficient to promote Ni metallization, indicating that pyridine functions to sufficiently increase the local $Pd^{II}$ surface concentrations to levels[23] that catalyze Ni deposition. Second, the XPS N(1s) signal is observed at 400 eV for a pyridine-treated NTF (note FIG. 4B) with low intensity, indicating that at least a portion of the pyridine resists outgassing from the NTF in the high vacuum chamber of the XPS and is strongly adsorbed at the surface. Similar behavior has been noted for solvent-templated planar polymer films, where strong pyridine adsorption contributes to lithographic performance and improved adhesion of the EL Ni film.[18, 20] In fact, the EL Ni films deposited here on helical and columnar NTFs also exhibit good adhesion (<5% Ni delamination in Scotch Tape® tests), consistent with the behavior noted for solvent-templated planar polymer films. For NTFs, however, their tailored surface morphology and/or topology can provide an additional factor promoting Ni adhesion not available for corresponding solvent-templated planar polymer films.

Figure 5:
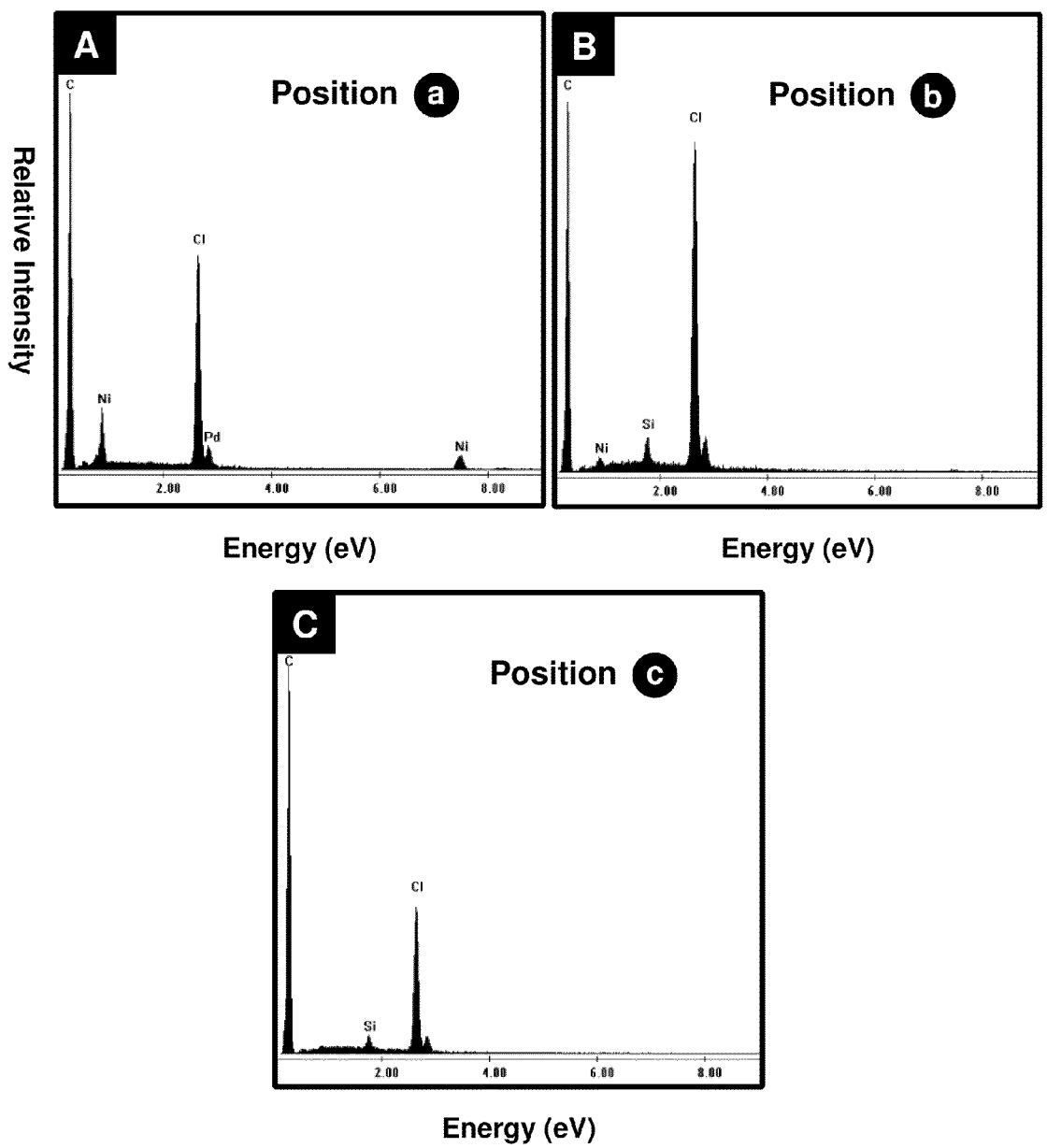
FIG. 5 shows a cross-sectional EDAX analysis of Ni plated helical NTF from FIG. 3. (A) Analysis of the surface cross-section of Ni film at point "a" in FIG. 3. Ni signals are accompanied by strong C and Cl signals and a weak Pd signal consistent with a porous Ni film and a thin Ni plate; (B) Analysis of film cross section at 20 μm depth at point "b" of FIG. 3 showing Ni-NTF interface region; (C) Analysis of film cross section at 40 μm depth at point "c" of FIG. 3 showing the unplated NTF region. For all spectra shown, units of ordinate are counts per minute and units of abscissa are energy (eV).

SEM analysis in FIG. 3A shows that Ni is deposited as a porous metal film on the underlying helical NTF. Similar topologies are observed by AFM for a helical NTF before and after Ni deposition in FIGS. 3B and 3C, respectively, consistent with a con formal, templated Ni deposition process. Conformal Ni deposition is confirmed in FIG. 3D, which shows the SEM cross section of a Ni plated helical NTF prepared using a pyridine (aq) solution treatment. An EDAX depth profile analysis of FIG. 3D is shown in FIG. 5 and identifies the coating as Ni metal and indicates that it penetrates the NTF to a depth of ~20 μm. Analogous experiments using pyridine vapor lead to deeper penetration of Ni (~40 μm, not shown), permitting tuning of the Ni membrane thickness. Such behavior is consistent with the model of FIG. 2 in that water, which solvates pyridine well but penetrates the hydrophobic pores of the NTF with difficulty, effectively limits contact of the pyridine to adsorption sites nearer to the NTF surface. In contrast, hydrophobic pyridine molecules in the vapor phase are capable of deeper penetration into the NTF pores, rendering hydrophobic NTF pore surfaces sufficiently hydrophilic via pyridine adsorption to facilitate deeper aqueous transport of the PD1 for catalysis and the EL Ni bath for plating.

Table 1 summarizes the root mean square (RMS) surface roughness and surface porosity values obtained from the AFM measurements for Ni films deposited on planar, helical NTF, and columnar NTF PPX-C films. Ni films deposited on the planar PPX-C films exhibit low roughness and are essentially non-porous. In contrast, Ni films plated onto the helical and columnar NTF templates are significantly rougher (~4-5 fold) with moderate degrees of porosity (30-35%), consistent with the nanostructured nature of the NTF templates. As expected, the column widening and separation of the columnar NTF templates deposition of a somewhat rougher Ni film (i.e., ~40 nm) than that observed for Ni films (i.e., ~35 nm) templated by the helical NTF, at least for the plating conditions used here. However, because EL Ni film morphology is sensitive to ligand and $Pd^{II}$ surface concentrations,[26] as well as plating conditions,[1] these factors offer the potential to readily control Ni roughness. For example, preliminary experiments show that helical NTFs treated for only ~17 h by pyridine (aq) solution provide rougher Ni films (i.e., ~68 nm), consistent with this argument.

TABLE 1

Characteristics of the EL Ni Films

| PPX-C Film Substrate[a] | Ni Film RMS Roughness (nm)[b] | Ni Film Surface Porosity (%)[b] |
|---|---|---|
| Planar[c] | 9 | <5 |
| Helical NTF[d] | 35 | 35 |
| Columnar NTF[d] | 40 | 30 |

[a]Type of PPX-C film used for EL Ni deposition.
[b]Values calculated from AFM scans as described in the Methods Section.
[c]Substrate treated 4 days at 22 ± 2° C. using 0.2 M pyridine (aq) solution, catalyzed 45 min by PD1 and plated 15 min using 10% NIPOSIT 468B ® EL Ni bath.
[d]Substrate treated 48 h at 22 ± 2° C. using 0.2 M pyridine (aq) solution, catalyzed 45 min by PD1 and plated 15 min using 10% NIPOSIT 468B ® EL Ni bath.

In contrast to roughness, Ni porosity is primarily influenced by the morphology of the underlying NTF template, at least for thin Ni films considered here (vide infra). Similar total surface porosity values shown in Table 1 for Ni films deposited on helical (35%) and columnar (30%) NTFs are best understood by considering the nucleation and growth of the NTF templates. Deposition of NTFs occurs via a mechanism in which initial surface migration of reactive species to nucleation sites promotes growth of clusters of nested helical or columnar PPX-C filaments.[15, 16] Within a cluster, individual 50-200 nm diameter PPX-C filaments are separated from adjacent filaments by distances of ~10-20 nm. Adjacent clusters are separated from one another by distances of ~200-400 nm, corresponding to the sizes of surface depletion regions in which migration has left the local concentrations of reactive species insufficient for new filament nucleation and growth. Consequently, templated Ni deposition on these NTFs leads to a bimodal pore distribution, as shown in FIG. 3A. Larger, irregular-shaped Ni pores (Type I, >70% population; ~60-120 nm width) and smaller nearly circular Ni pores (Type II, <30% population; ~10-40 nm diameter) are observed, tentatively corresponding to NTF templates comprising separations of PPX-C clusters and individual filaments, respectively. Because the larger type I pores dominate pore surface areas, similar total surface porosity values are obtained for both helical- and columnar-templated Ni films.

Precise measurements of the thickness of Ni deposited on the NTF top surface are rendered difficult by the inherent roughness of the NTF (i.e., ~40-60 nm).[15, 16] Never-the-less, focused ion beam milling to selectively remove Ni from helical NTF regions corresponding to PPX-C filament clusters (i.e., regions associated with Type II pores in FIG. 3A), followed by SEM examination of the milled area cross-sections, yields a Ni thickness of ~80-100 nm. In comparison, Ni films of ~35-40 nm thickness are deposited on flat aminosiloxane-coated Si wafers catalyzed and plated under conditions identical to those used for our NTFs.[27] Such differences are not unexpected, given the magnitude of the NTF surface roughness and the isotropic nature of the EL deposition process. Specifically, the combination of perpendicular and lateral Ni growth from catalyzed PPX-C filament tips and sidewalls at the NTF top surface, respectively, leads to more rapid agglomeration and fusion of adjacent Ni nodules than for a flat surface, effectively enhancing the apparent Ni deposition rate. Consequently, measured Ni thickness reflects contributions from Ni deposited perpendicular to the NTF surface plane at PPX-C cluster and filament tips and Ni laterally deposited in filament interstices near the NTF surface. Ni surface roughness is simultaneously decreased (note Table 1) as Ni fills the filament interstices, in support of this mechanism.

Similar difficulties are encountered in characterizing the Ni plate deep within the NTF pores, where mixed potential theory (MPT) arguments predict thinner Ni deposits due to non-linear diffusion and reagent concentration depletion effects.[10, 25, 28] Observation of Ni deposition at greater depths (i.e., ~40 μm) inside NTFs treated by pyridine vapor than for those treated by pyridine (aq) solution (~20 μm) lends support for the presence of thinner Ni films deep within the pores, consistent with MPT predictions. It further indicates that at least some larger type I pores likely remain open throughout their length following Ni plating of NTFs treated by pyridine (aq) solution. In fact, in separate experiments coloration of an underlying helical NTF via diffusion of aqueous thymol blue solution through the porous Ni film coating is observed, confirming the open nature of the pores in the Ni membranes.

Having described the invention, the following examples are given to illustrate specific applications of the invention. These specific examples are not intended to limit the scope of the invention described in this application.

Methods

All chemicals were A.C.S. reagent grade and were used as received from Aldrich Chemical Co. unless otherwise noted. Nitrogen gas was from liquid $N_2$ boil-off and $H_2O$ was deionized (18 MΩ-cm resistivity; BARNSTEAD NANOPURE II® deionizer). Native oxide n-type <100> Si wafers were from Wafernet Inc. Poly(chloro-p-xylylene (PPX-C) planar films and NTFs were prepared from dichloro-[2.2]paracyclophane (DCPC; a.k.a. dichloro-di-p-xylylene or Parylene Type C; Lot #060514; Parylene Distribution Services Inc.) on native oxide Si wafers using the procedure and instrument described previously.[15, 16] Each film was deposited using ~0.7 g DCPC at vaporizer and pyrolysis temperatures of 175° C. and 690° C., respectively. The flux deposition angle (α), film growth angle (β) and turntable rotation rate (ω) for the helical and columnar NTFs used here are shown in FIG. 1. PD1 electroless Pd(II) catalyst dispersion was prepared from $Na_2C_4.3H_2O$ (Strem Inc.), morpholinoethane sulfonic acid, and NaCl according to the literature procedure.[24] The NIPOSIT 468B® EL Ni bath from Rohm & Haas (Shipley Co.) was prepared according to the manufacturer's instructions; the bath was diluted to 10% strength with $H_2O$ prior to use.

The general procedure is described and all work was performed in a well-ventilated fume hood. Samples of PPXC films (either planar or nanostructured) were immersed in (solution deposition) or suspended over (vapor deposition) freshly-prepared 0.1-0.2 M pyridine (aq) solution at 22±2° C. for ~40-48 h in a tightly sealed glass jar to adsorb pyridine ligand onto the film surface. Samples were then removed from jar, rinsed 3 times in $H_2O$, and dried in a stream of filtered $N_2$ gas. Samples were next treated with PD1 catalyst for ~45 min. Excess PD1 catalyst was carefully removed from the sample surface by Pasteur pipet. The samples were then gently rinsed 2 times in $H_2O$ and immediately immersed in the EL Ni bath for ~15-20 min at 22±2° C. for plating. The samples were occasionally agitated gently to remove any bubbles of hydrogen gas adhering to the surface. Following plating, samples were rinsed 2 times in $H_2O$, dried in a stream of filtered $N_2$ gas, and visually inspected to ascertain the degree of metallization, if any. Dried plated samples were stored in FLUOROWARE® containers until needed for characterization. Ni porosity was confirmed as follows: A Ni-coated helical NTF on a Si wafer was placed on a flat surface and a 20 FL droplet of 1.0 M thymol blue dye (aq) solution was applied to the center of the Ni film. An inverted beaker was placed over the sample to minimize evaporation of the droplet and the system was allowed to stand undisturbed for ~3 h. The droplet was then carefully removed from the Ni surface using a microsyringe and the sample was allowed to air dry for ~30 min. The Ni-coated NTF was then carefully peeled from the Si wafer support and examined for the presence of dye coloration of the underlying white NTF due to dye diffusion through the Ni film.

Characterization:

X-ray photoelectron spectroscopy (XPS) data were acquired using an Axis Ultra XPS system (Kratos) with a monochromatic Al Kα X-ray source, 20 eV pass energy (700 μm×300 μm hybrid sample spot size), and 90° take-off angle under high vacuum conditions ($10^{-9}$ Torr). All spectra were referenced to the C(1s) peak at 284.6 eV and analyzed using the CasaXPS v. 2.1.9 program supplied by the manufacturer. Spectra were corrected for variations in detector sensitivity between elements to estimate surface abundance (at. %) using instrument correction factors supplied by the manufacturer and literature procedures.[29] Ni film morphology was characterized using a SEM (XL-30, Philips), as well as an AFM (Nanoscope E, Veeco Inc.) equipped with an air chamber and silicon nitride cantilevers operating in contact mode. Surface roughness of bare and Ni plated NTFs was also calculated from the AFM measurements after image data correction to account for sample tilt and application of a median filter. For porous Ni samples, pore densities, distributions, and diameters were estimated by projecting the AFM image onto the x-y plane using data acquired from five randomly selected 2 μm×2 μm scanned regions on each sample. Surface porosity is calculated by analyzing the bearing curve of the AFM image at its inflection point. The cross-sectional structure of and penetration of the Ni into the NTFs was probed ($10^{-7}$ Torr) using the energy dispersive x-ray attachment (EDAX, Ametex) of the SEM. For Ni thickness measurements, a focused ion beam (FEI Quanta 200 3D, OR) of $Ga^+$ was impinged on the Ni templated NTF surface with 30 kV kinetic energy to remove Ni from the surface, followed by observation and measurement of the Ni cross section thickness using a field emission scanning electron microscope (JEOL 6700F, Japan).

Illustrated by the foregoing description is a simple method for conformal EL Ni deposition that permits control of Ni morphology and topology via use of tailored nanostructured PPX-C thin polymer film templates. The metallization process is well described using a model adapted from the literature[18] and relies on non-covalent adsorption of metal-binding ligand to NTFs to covalently anchor the $Pd^{II}$ catalyst required for EL Ni deposition. In the present invention, direct chemical modification of PPX-C leading to potential degradation of its biocompatible surface is avoided while maintaining Ni adhesion and control of the metal-polymer interface. Although Ni films are used in this example, Ni films are but one example. The fabrication of films of other metals, oxides, and biomolecules by electroless, CVD, or direct binding methods[14, 30, 31] is clearly possible, provided that suitable "ligand" adsorbates are available to template material deposition. Although, specific embodiments are described, the present invention is not limited to these specific embodiments. The present invention contemplates extending this process to include materials useful for biomedical implant, metal-dielectric composite, energy storage, SERS platform, and/or other similar or related applications. For example, the present invention contemplates functionalization of surfaces for cell adhesion, for specific controlled drug release, tissue targeting, localized delivery, lower dose administration and improved side effect profiles.

Example 1

Nanostructured poly(chloro-p-xylylene) Polymer Film (PPX-Cl) Having a Columnar Structure A silicon wafer coated by a vinylsiloxane self-assembled monolayer (SAM), prepared by 60 min treatment of a clean silicon wafer with a 1% solution of vinyltrimethoxysilane (Gelest Inc.; Cat. No. SIV9220.0) in 1 mM acetic acid/ethanol, was placed in a home built oblique angle vacuum deposition chamber.[32, 33] Briefly, the chamber comprises in tandem a vaporization oven, vapor pyrolysis oven, vapor direction nozzle, and a stepper motor controlled sample turntable holder capable of varying the incident angle between the nozzle and sample holder and (optionally) rotating the sample within the sample holder plane, with all components contained within a vacuum chamber. A ~0.7 g sample of dichloro-[2.2]paracyclophane (DCPC; a.k.a. dichloro-di-p-xylylene or Parylene Type C; Parylene Distribution Services; Lot No. 060514) was placed in the vaporization oven. The system was evacuated and the pressure maintained at 30-50 mbar at the sample deposition holder with the vaporization oven operated at 175° C. and the pyrolysis oven at 690° C. DCPC vapor produced in the vaporization oven was fed into the pyrolysis oven to generate reactive intermediates, which were directed through the nozzle to impact the Si wafer sample at an angle $\alpha=10°$ relative to the Si wafer surface plane, as shown in FIG. 1A. The sample was held stationary (i.e., $\omega=0$ $s^{-1}$) during the ~10 min deposition time. Oblique angle impact of the reactive intermediates with the Si wafer surface generated columns of PPX-Cl inclined at an angle $\beta\cong55°$ with respect to the Si wafer surface plane, as shown in FIG. 1B. Individual PPX-Cl column diameters were ~150 nm with an average column packing density of ~$4\times10^7$ columns/$mm^2$.

Example 2

Nanostructured poly(chloro-p-xylylene)polymer Film (PPX-Cl) Having a Helical Structure The procedure of Example 1 was repeated while rotating the sample turntable (i.e., $\omega=0.167$ $s^{-1}$) during the film deposition to produce a nanostructured PPX-Cl film having a helical film morphology, as shown in FIG. 1C.[34]

Example 3

Nanostructured Poly(Trifluoroacetyl-p-xylylene) Polymer Film (PPX-TFA) Having a Columnar Structure The procedure of Example 1 was repeated using trifluoroacetyl-[2.2]paracyclophane to form a nanostructured poly (trifluoroacetyl-p-xylylene) polymer film having PPX-TFA columns of ~150 nm diameter.[35]

Example 4

Nanostructured poly(bromo-p-xylylene) Polymer Film (PPX-Br) Having a Columnar Structure The procedure of Example 1 was repeated using dibromo-[2.2]paracyclophane to form a nanostructured poly(bromo-p-xylylene) polymer film having PPX-TFA columns of ~200 nm diameter.[32]

Example 5

Figure 4:
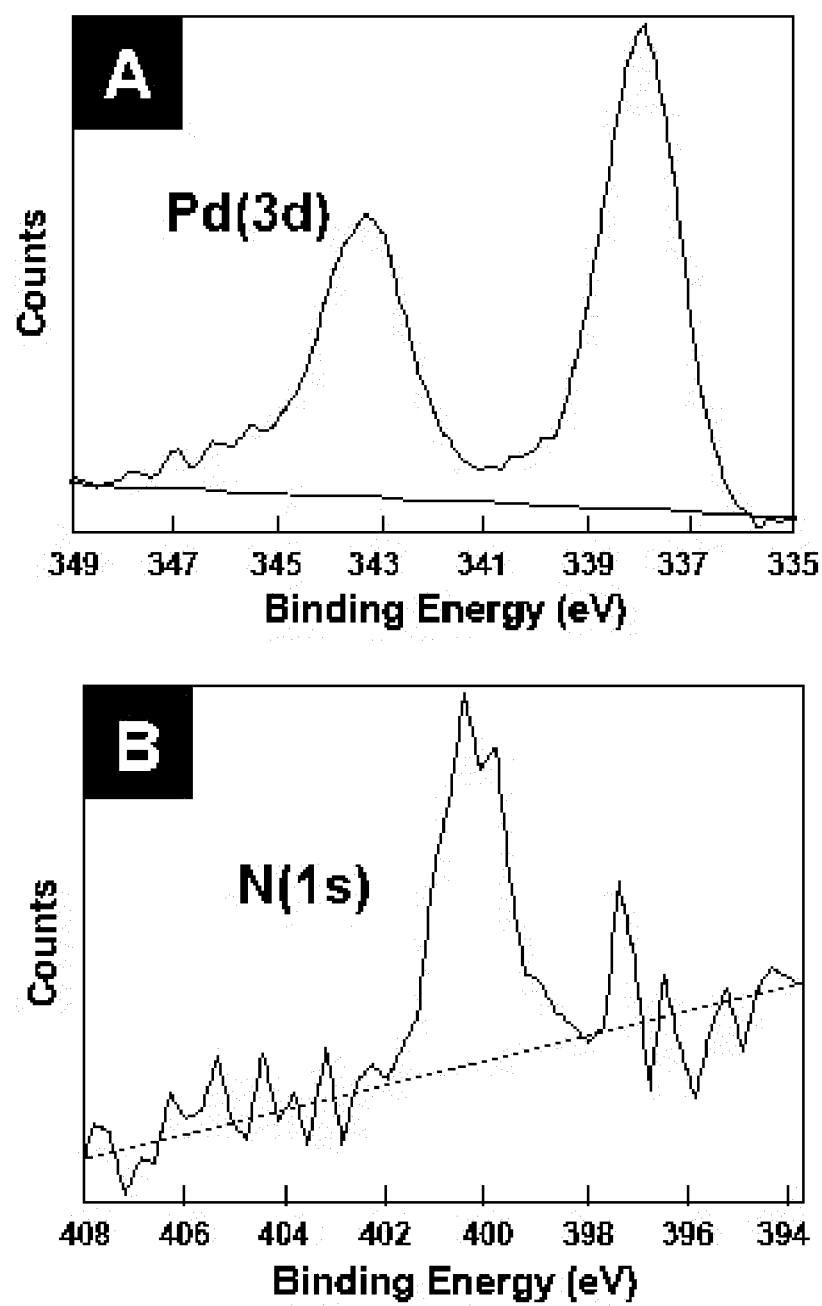
FIG. 4 shows an XPS analysis of helical PPX-C NTFs. (A) $Pd(3d_{5/2})$ spectrum for helical NTF treated sequentially by pyridine (aq) solution and PD1 (note Methods Section); (B) N(1s) spectrum for helical NTF treated by pyridine (aq) solution (note Methods Section).

Binding of Pyridine from Aqueous Solution by PPX-Cl Nanostructured Polymer Films A PPX-Cl sample, prepared as described in Example 2, was immersed for ~40-48 h in a 0.2 M pyridine (aq) solution at ~22±2° C. The sample was then rinsed with deionized water, dried in a filtered stream of $N_2$ gas (from liquid nitrogen boil-off), and analyzed by X-ray Photoelectron Spectroscopy (XPS). An XPS N(1s) signal at a binding energy of ~400 eV associated with bound pyridine was observed, as shown in FIG. 4B. No N(1s) signal was observed for a control PPX-Cl sample not treated by pyridine (aq) solution.

Example 6

Binding of Pyridine Via Vapor Phase Treatment by PPX-Cl Nanostructured Polymer Films A 75 mL aliquot of 0.2 M pyridine (aq) solution was placed in a 100 mL capacity Coplin jar. A sample of the PPX-Cl film on a Si wafer from Example 2 was secured to the inside lid of the Coplin jar via use of double sided adhesive tape on the back of the Si wafer. The lid was placed on the Coplin jar with the PPX-Cl film held above and facing the pyridine (aq) solution. The lid was then secured using Parafilm® to form an airtight seal. After 40-48 h vapor phase treatment of the PPX-Cl sample at ~22±2° C., the jar was opened and PPX-Cl sample was processed and analyzed as described in Example 5. Appearance of the XPS N(1s) peak at ~400 eV confirmed binding of pyridine by the PPX-Cl film.

Example 7

Preferential Binding of a Pd(II) Colloid by Pyridine-treated PPX-Cl Nanostructured Polymer Films A colloidal Pd(II) dispersion, designated hereafter as PD1, was prepared via controlled hydrolysis of a solution containing $Na_2PdCl_4 \cdot 3H_2O$, morpholinoethanesulfonic acid, and NaCl at pH 5 according to the literature procedure).[24] The pyridine-treated PPX-Cl sample from Example 5 was immersed in the aqueous PD1 colloidal dispersion for 45 min, then carefully rinsed twice with deionized water and dried in the filtered $N_2$ gas stream. XPS analysis of the treated sample in FIG. 4A shows a Pd $3d_{5/2}$ signal comprising components at ~339 eV associated with a $Pd^{II}$-N covalently bonded species and at ~337-338 eV associated with the $Pd^{II}$-Cl and $Pd^{II}$-OH components of the chloro/hydroxyl-bridged $Pd^{II}$ colloid. The Pd(II) is present at a surface concentration of ~0.74 at. %. A control helical nanostructured PPX-Cl sample not containing bound pyridine also gave a signal at ~337-338 eV due to bound $Pd^{II}$ colloid (not shown). However, the surface concentration of $Pd^{II}$ was only 0.39 at. %, consistent the preferential binding of $Pd^{II}$ species by the pyridine treated PPX-Cl sample.

Example 8

Selective Metallization of the Pyridine Treated PPX-Cl Sample Catalyzed by PD1 Immersion from Example 7 Using an Electroless Ni Plating Bath An electroless Ni NIPOSIT 468B® plating bath (Rohm & Haas Inc., Shipley Division) was prepared according to the manufacturer's instructions at pH 7 and then diluted to 10% strength with deionized water for use. The procedure of Example 7 was repeated to produce pyridine treated PPX-Cl and PPX-Cl samples catalyzed by immersion in the PD1 aqueous colloidal dispersion. After careful rinsing with deionized water to remove any unbound $Pd^{II}$ species following the PD1 treatments, the samples were immersed in the electroless Ni bath for ~15-20 min at ~22±2° C. After plating, the samples were rinsed with deionized water, dried in the filtered $N_2$ gas stream, and inspected for the presence of Ni metal, if any. For the nanostructured PPX-Cl sample not bearing bound pyridine, typically no Ni metal was observed. (In a few isolated cases, small spots of Ni metal were observed comprising <5% of the PD1 treated area and sporadically distributed over the PPX-Cl surface, consistent with incomplete rinsing and/or localized binding of $Pd^{II}$ at these sites at levels exceeding the ~$10^{15}$ $Pd^{II}$ ions/cm² threshold required to initiate Ni metal deposition as described in the literature.[23] Similar levels of sporadic Ni deposition were also observed on identically processed planar PPX-Cl control films (prepared according to Example 1 with α=90° relative to the Si wafer surface plane and ω=0 s$^{-1}$)) In contrast, the pyridine treated nanostructured PPX-Cl consistently plated Ni over the entire PD1 treated surface area as shown in FIG. 3A (inset), indicating that sufficient $Pd^{II}$ is bound to reliably catalyze Ni deposition. XPS analysis of the plated surface in this case indicates a strong Ni(2p) signal at 852 eV characteristic of Ni metal (not shown). Ni plating was confluent with and the Ni morphology was defined by the underlying nanostructured PPX-Cl film, as shown in FIGS. 3B and 3C. A cross-sectional scanning electron micrograph of the Ni plated sample shown in FIG. 3D indicates that Ni plating of the outermost ~20 μm of each PPX-Cl column in the sample occurs (total sample thickness ~60 μm), as confirmed by cross-sectional EDAX analysis of the sample in FIG. 5.

Example 9

Selective Metallization of the PPX-Cl Sample of Example 6 Prepared by Vapor Phase Pyridine (aq) treatment and PD1 Catalysis A PPX-Cl sample prepared as described in Example 2 was treated with pyridine vapor as described in Example 6 and catalyzed using the aqueous PD1 colloidal dispersion as described in Example 7. The sample was subsequently treated with the electroless Ni bath according to the procedure of Example 8. A Ni plate was visually observed over then entire PD1 treated surface area and confirmed by XPS Ni(2p) analysis (not shown). A cross-sectional scanning electron micrograph of the Ni plated sample (not shown) indicated that the outermost ~40 μm of each PPX-Cl column in the sample occurs (total sample thickness ~60 μm).

Example 10

Figure 6:
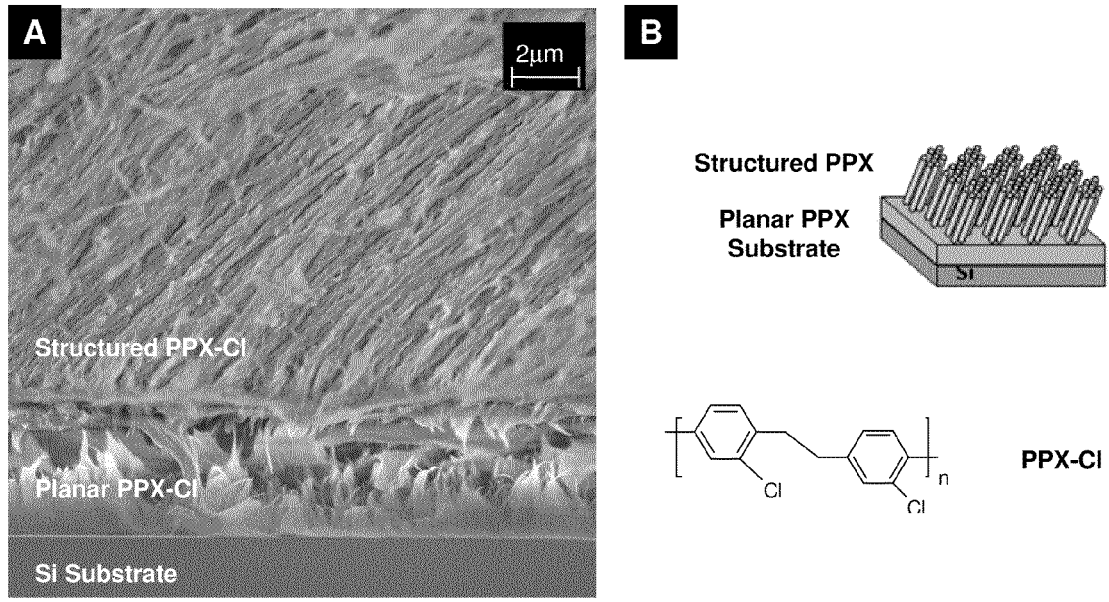
FIG. 6 shows a multi-layer deposition of PPX-Cl film: (a) Cross-section SEM micrograph of a composite planar-structured polymer film (scale bar 2 μm) (b) Schematic of the two layer deposition.

Nanostructured poly(chloro-p-xylylene) Polymer Film (PPX-Cl) Having a Dual Structure A two-layer film which has both planar and structured PPX films was deposited (i.e., dual structure of PPX) by initially holding the substrate perpendicular to the vapor flux (α=90°; ω=0 s$^{-1}$) that forms the planar film layer to deposit a flat PPX-Cl film. Subsequently, the substrate was tilted to an inclined angle (α=10°; ω=0 s$^{-1}$) and deposition was continued to fabricate a layer of columnar PPX-Cl grown from the surface of the flat PPX-Cl film. FIG. 6 shows a cross sectional image of this dual planar-nanocolumnar structure PPX-Cl film which is formed by vapor deposition polymerization.[36]

Example 11

Selective Electroless Cobalt Metallization of the PPX-Cl Sample of Example 6 Prepared by Vapor Phase Pyridine (aq) Treatment and PD1 Catalysis A cobalt electroless bath was freshly prepared by dissolving 0.9 g of tetrasodium ethylenediaminetetraacetic acid (EDTA), 1 g of ammonium chloride and 0.6 g of cobalt chloride in 15 mL of water. The pH of this bath was adjusted to 8.2 by the drop-wise addition of 0.1 M NaOH solution. Boranedimethylamine (0.4 g) was then dissolved in 5 mL of water and added to the bath. A PPX-Cl sample was treated with pyridine (aq) solution according to the vapor phase method of Example 6 and then with PD1 catalyst via the method of Example 7. The PPX-Cl substrates were then immersed in the electroless cobalt bath at 25±0.5° C. for various times ranging from ~15 min to ~240 min to deposit Co metal onto the PPX-Cl films. The films were then washed in deionized water and dried under $N_2$ gas. Dried samples were stored in Fluoroware® containers until needed for characterization or use as hydrogen evolution catalysts. The appearance of a peak at 777.9 eV in the XPS Co($2p_{3/2}$) spectrum identified the metal coating as cobalt. A planar PPX-Cl sample control film treated with pyridine per Example 6, PD1 per Example 7, and electroless cobalt bath per Example 11 exhibited only sporadic Co plating over less than 5% of the PD1 treated area.

Example 12

Figure 7:
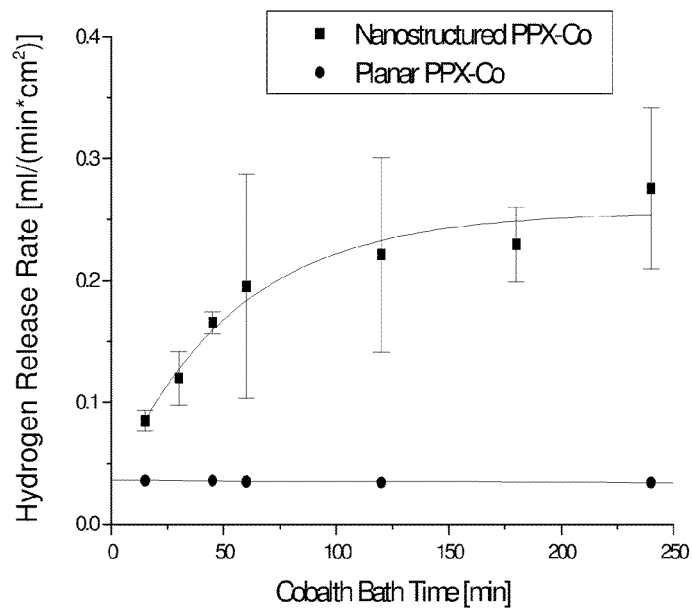
FIG. 7 shows the hydrogen release rate (mL $cm^{-2} \cdot min^{-1}$) from the nanoporous and planar cobalt surface measured in 2.5% $NaBH_4$ and 1% NaOH at 25° C.

Cobalt Plated PPX-Cl Nanostructured Thin Films of Example 11 as Efficient Hydrogen Generation Catalysts An aqueous solution containing 2.5% $NaBH_4$ (0.677 M) and 1% NaOH (0.261 M) at constant pH=13 was freshly prepared and placed in a 125 mL beaker. A piece of cobalt coated PPX-Cl (or control PPX-Cl) film from Example 11 was placed in the beaker and a water column was immediately placed over the PPX-Cl sample to trap and measure released hydrogen gas. The amount of hydrogen released at 25±0.5° C. was recorded with respect to time. From these data, the release rate was obtained by differentiating the hydrogen release volume with respect to time. The hydrogen release rate was measured in mL of $H_2$ per square centimeter of the cobalt film per minute ($mL \cdot cm^{-2} \cdot min^{-1}$). The rate was also measured in mass units as mL of $H_2$ per gram of cobalt per minute ($mL \cdot g^{-1} \cdot min^-$) by calculating the mass of cobalt deposited on the PPX-Cl film. The hydrogen release rate data shown in FIG. 7 exhibit an asymptotic increase for nanostructured PPX-Cl films coated by thicker Co films prepared by longer PPX-Cl plating times in the electroless Co bath. In contrast, the corresponding planar PPX-Cl control films show very little catalyst activity, reflecting the markedly lower levels and coverages of the Co films on these substrates.[37]

Example 13

Binding of Thiophenol Ligand by the Nanostructured PPX-Cl Film

A PPX-Cl nanostructured thin film, prepared as described in Example 1, was immersed in an ~1 mM solution of thiophenol in ethanol for 48 hr at 25±1° C. The PPX-Cl sample was then removed from the solution, rinsed in ethanol, and dried in a filtered stream of $N_2$ gas. The presence of a XPS S(2p) peak at ~160.1 eV (with respect to the C(1s) peak at ~282.0 eV) confirmed binding of thiophenol ligand by the PPX-Cl film.

Example 14

Figure 8:
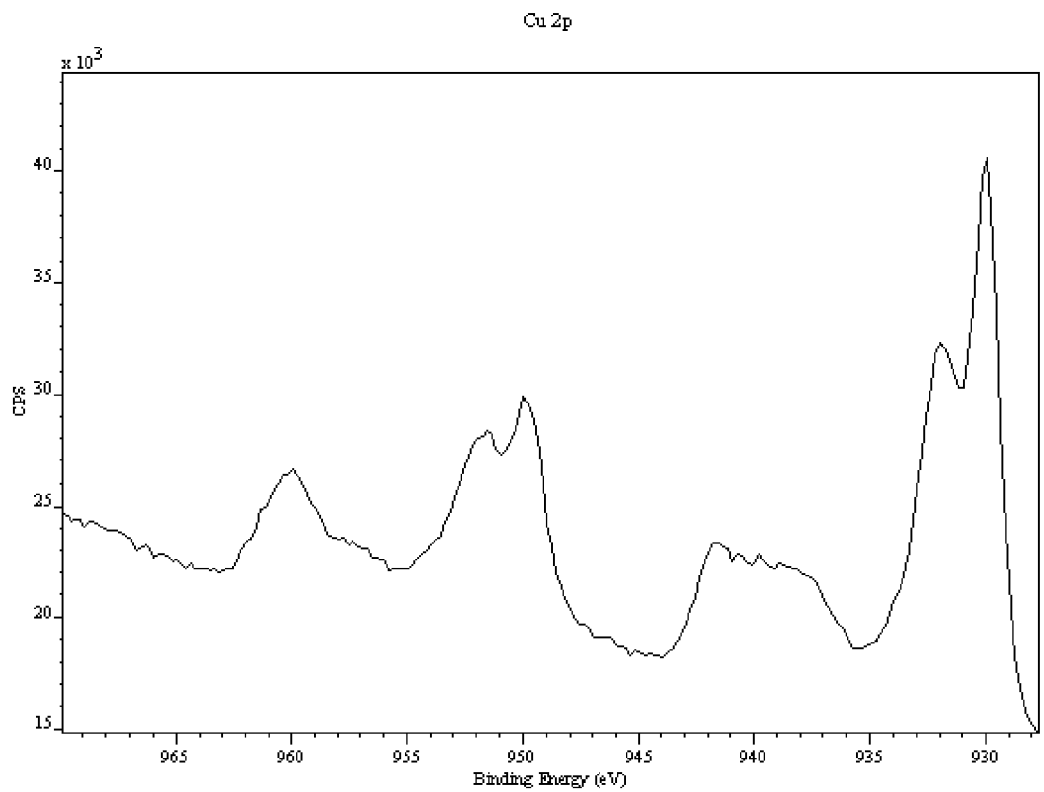
FIG. 8 shows an XPS analysis of columnar PPX-Cl NTFs. (A) Cu(2p) spectrum for PPX-Cl treated by thiophenol (aq) solution and Cu(II); (B) S(2p) spectrum for PPX-Cl treated by thiophenol (aq) solution and Cu(II).
Figure 8:
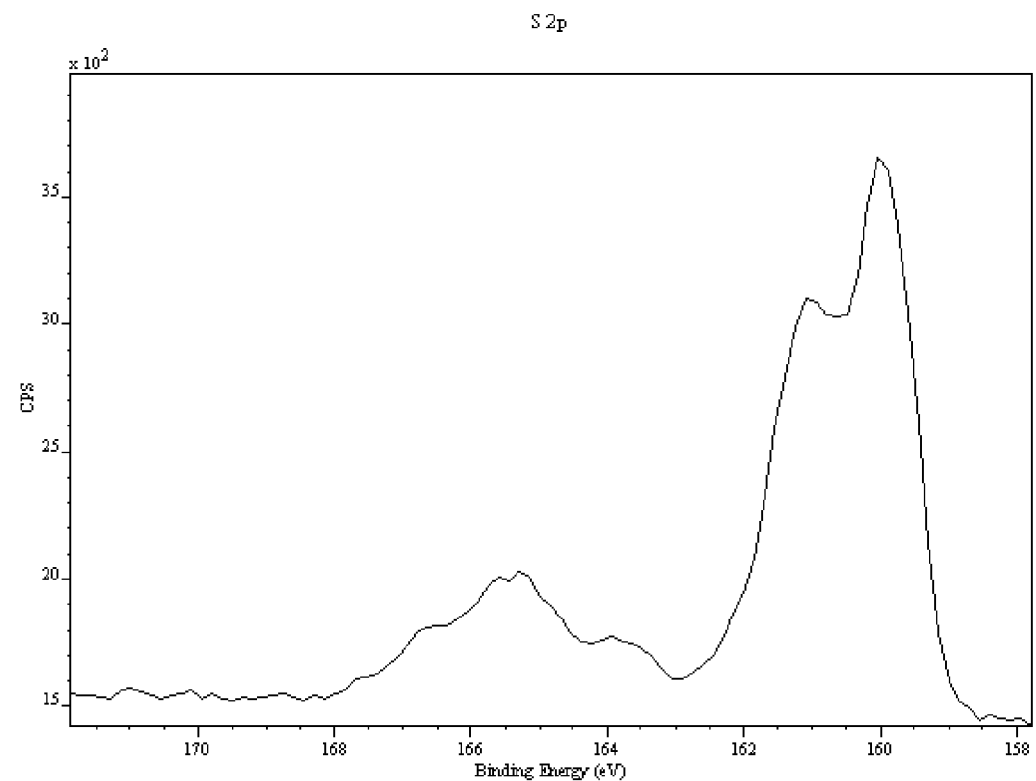

Preferential Binding of Cu(II) Species by Thiophenol Treated PPX-Cl Nanostructured Polymer Films An aqueous solution of copper(II) chloride (0.02 M, 1.5 ml) was diluted to 30 mL by addition of water. The PPX-Cl film treated by thiophenol from Example 13 was immersed in the Cu(II) solution for 45 minutes. The treated PPX-Cl sample was then washed in water, dried in a filtered $N_2$ gas stream, and characterized by XPS. Strong peaks in the XPS Cu(2p) region and the S(2p) region, as shown in FIGS. 8A and 8B, respectively, confirm the binding of thiophenol and Cu species by the nanostructured PPX-Cl film. Neither Cu(2p) nor S(2p) signals were observed for a nanostructured control PPX-Cl film, prepared as described in Example 1, and treated directly with the Cu(II) species in the absence of a pre-treatment by the thiophenol.

Example 15

Figure 9:
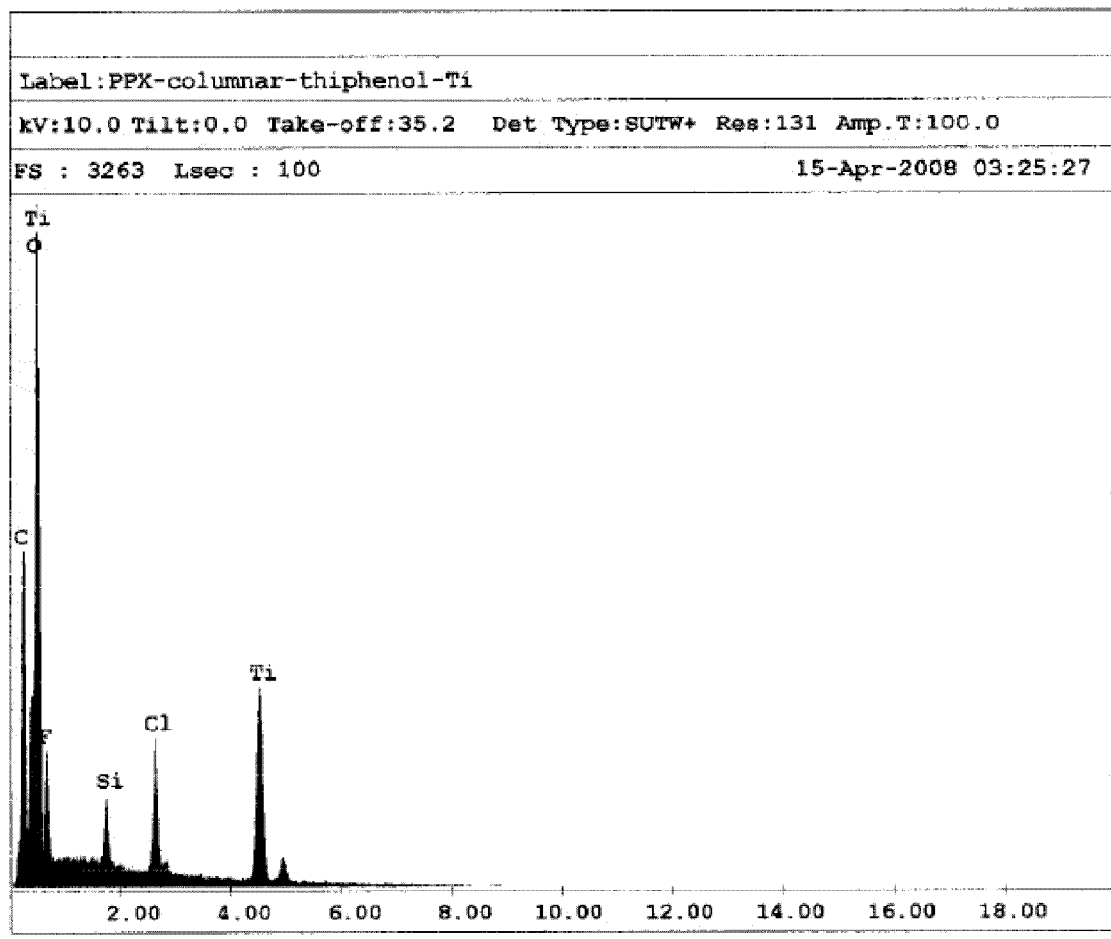
FIG. 9 shows the EDAX spectrum of a columnar naniostructured PPX-Cl film treated sequentially by thiophenol and $TiO_2$ deposition solution after sonication, rinsing, and drying according to the process described in Example 15.
Figure 10:
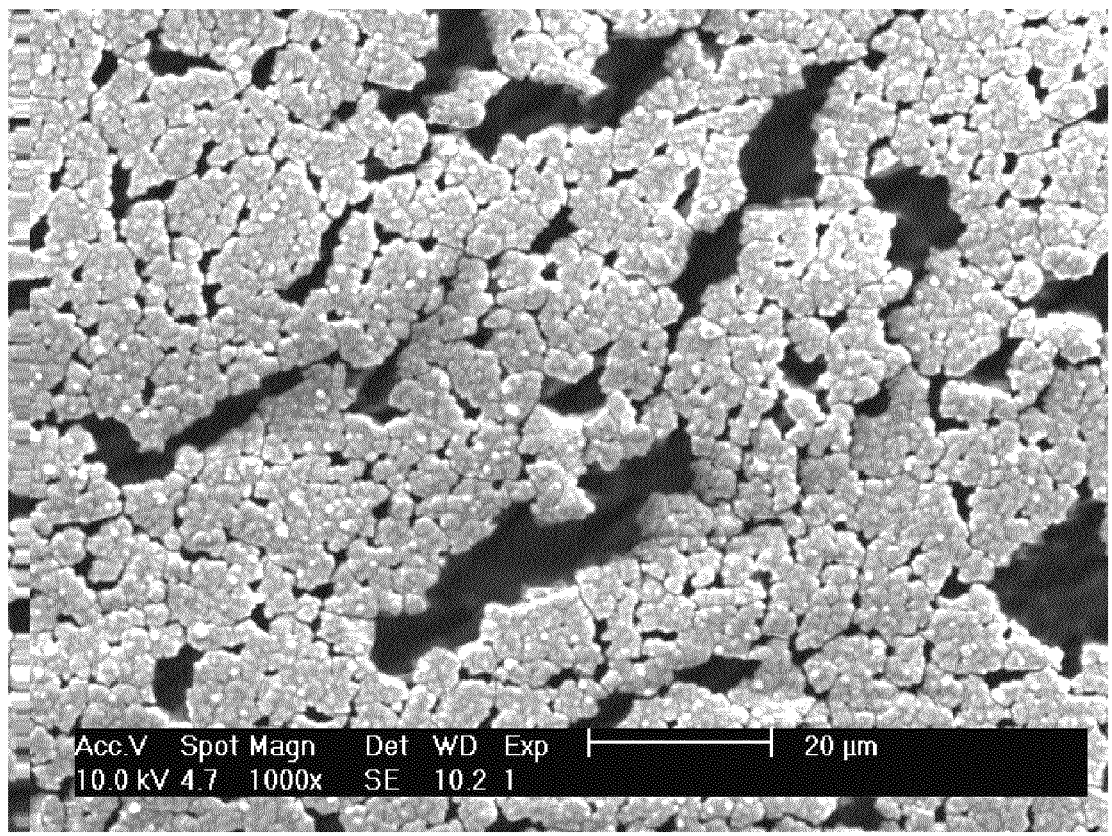
FIG. 10 shows an SEM image (top view) of a columnar nanostructured PPX-Cl film treated according to the process described in Example 15 by thiophenol and $TiO_2$ deposition solution after sonication, rinsing, and drying. The image shows the $TiO_2$ coated PPX-Cl nanocolumns.

Preferential Binding of a $TiO_2$ by the Thiophenol-treated PPX-Cl Nanostructured Polymer Films A fresh $TiO_2$ deposition bath was prepared containing 0.05 M of $(NH_4)_2TiF_6$, and 0.15 M $H_3BO_3$ and the pH was adjusted to 2.88 with addition of HCl as described in the literature.[30] A PPX-Cl film, prepared as described in Example 1 and treated with thiophenol as described in Example 13, was immersed vertically in the $TiO_2$ deposition bath for 18 hours at ~50° C. to minimize the spurious precipitation of titanium dioxide particles from solution onto the substrate surface. Following completion of titanium dioxide particle deposition, the film was sonicated to remove any loosely bound or precipitated titanium dioxide from the surface. A thin film of titanium dioxide, identified by its characteristic EDAX spectrum in FIG. 9, was observed on the nanostructured PPX-Cl film surface visually and by SEM in FIG. 10. A planar PPX-Cl film, treated with thiophenol as described in Example 13, and a nanostructured PPX-Cl film, prepared as described in Example 1 but not treated with thiophenol, were identically treated in the $TiO_2$ deposition bath and processed as controls. Titanium dioxide was deposited sporadically over less than 5% of the surface of the planar PPX-Cl control film treated with thiophenol. No visible titanium dioxide was observed on the control nanostructured PPX-Cl film that had not been pre-treated with thiophenol.

Example 16

Preparation of a Nanostructured poly(amino-p-xylylene) Polymer Film (PPX-$NH_2$)

A columnar nanostructured PPX-NH2 thin film was prepared as described in Example 1 from amino-[2.2]paracyclophane.

Example 17

Preferential Binding of a Biomolecule Onto a Nanostructured PPX-$NH_2$ Film A 2 μg/mL aqueous solution of Green Fluorescent Protein (GFP, an intrinsically fluorescent protein) was prepared. The nanostructured PPX-$NH_2$ film from Example 16, together with a corresponding planar PPX-$NH_2$ film (prepared as described in Example 1 with α=90° relative to the Si wafer surface plane and ω=0 $s^{-1}$), were immersed in the GFP solution in a capped flask at room temperature overnight. The films were then removed from solution, placed in the desiccator to equilibrate for 20 min, and then washed with deionized water to remove any loosely bound or unbound material from the surface. Examination of the treated PPX-$NH_2$ samples using a fluorescent microscope showed that the nanostructured PPX-$NH_2$ films exhibit ~5-10 times higher GFP fluorescence intensity than their planar PPX-$NH_2$ counterparts.[38]

Obviously, many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

REFERENCES

All references listed throughout the Specification, including the references listed below, are herein incorporated by reference in their entireties.
1. Mallory, G. O. (Eds.: Mallory, G. O. & Hajdu, J. B.) in Electroless Plating: Fundamentals & Applications Ch. 1 (American Electroplaters and Surface Finishers Society, Orlando, Fla., 1990).
2. Smith, A. J. and Trimm, D. L., *Ann. Rev. Mater. Res.* 35, 127 (2005).
3. Chao, C. W., Wu, Y. C. S., Hu, G-R., Feng, M-S., *J. Electrochem. Soc.* 150, C631 (2003).
4. Zhang, L-S., Wang, W., Li, Z-Y. *J. Inorg. Mater.* 21, 1103 (2006).
5. Yuasa, K. and Ikoma, M., *Res. Chem. Intermed.* 32, 461 (2006).
6. Williams, S. M., Stafford, A. D., Rodriguez, K. R., Rogers, T. M., Coe, J. V., *J. Phys. Chem.* B 107, 11871 (2003).
7. Lee, I., Hammond, P. T., Rubner, M. F., *Chem. Mater.* 15, 4583 (2003).
8. Chen, B.-H., Hong, L., Ma, Y., Ko, T.-M., *Ind. Eng. Chem. Res.* 41, 2668 (2002).
9. Lee, C-C. and Chou, T-S., *Ind. Eng. Chem. Res.* 37, 1815 (1998).
10. Vanderputten, A. M. T. and Debakker, J. W. G., *J. Electrochem. Soc.* 140, 2229 (1993).
11. Zhang, X. and Tu, K-N., 128, 15036 (2006).
12. Ishii, D. et. al., *Chem. Mater.* 18, 2152 (2006).
13. Knez, M. et. al., *Nano Lett.* 3, 1079 (2003).
14. Price, R. R., Dressick, W. J., Singh, A., *J. Am. Chem. Soc.* 125, 11259 (2003).
15. Demirel, M. C., So, E., Ritty, T. M., Naidu, S. H., Lakhtakia A., *J. Biomed. Mater. Res. B*, 81B(1), 219 (2007).
16. Pursel, S., Horn, M. W., Demirel, M. C., Lakhtakia, A., 46, 9544 (2005).
17. Gleiter, R., Hopf, H. Modern Cyclophane Chemistry, (Wiley-VCH, New York, 2004).
18. Chen, M-S., Brandow, S. L., Schull, T. L., Chrisey, D. B., Dressick, W. J., *Adv. Func. Mater.* 15, 1364 (2005).
19. Brandow, S. L., Schull, T. L., Martin, B. D., Guerin, D. C, Dressick, W. J., *Chem. Eur. J.* 8, 5363 (2002).
20. Dressick, W. J. et. al., *Appl. Phys. Lett.* 78, 676 (2001).
21. Martin, B. D., Brandow, S. L., Dressick, W. J., Schull, T. L., *Langmuir*, 16, 9944 (2000).
22. Dressick, W. J., Chen, M-S., Brandow, S. L., *J. Am. Chem. Soc.*, 122, 982 (2000).
23. Dressick, W. J., Dulcey, C. S, Georger Jr., J. H., Calabrese, G. S., Calvert, J. M., *J. Electrochem. Soc.*, 141, 210 (1994).
24. Dressick, W. J. et. al., *Coll. Surf. A* 108, 101 (1996).
25. Chen, M-S. et. al., *J. Electrochem. Soc.* 146, 1421 (1999).
26. Brandow, S. L., Dressick, W. J., Marrian, C. R. K., Chow, G-M., Calvert, J. M., *J Electrochem. Soc.* 142, 2233 (1995).
27. Ma, D. I. et. al., *Chem. Mater.* 14, 4586 (2002).
28. Ohno, I., *Mater. Sci. Eng. A* 146, 33 (1991).
29. Moulder, J. F., Stickle, W. F., Sobol, P. E., Bomben, K. D. (Eds.: Chastain, J. and King Jr., R. C.) in Handbook of X-ray Photoelectron Spectroscopy p. 25 (Physical Electronics Inc., Eden Prairie, Minn., 1995).
30. Koumoto, K., Seo, S., Sugiyama, T., Seo, W. S., Dressick, W. J., *Chem. Mater.* 11, 2305 (1999).
31. Potochnik, S. J., Pehrsson, P. E., Hsu, D. S. Y., Calvert, J. M., *Langmmir* 11, 1841 (1995).
32. Cetinkaya, M. Malvadkar, N., Demirel, M. C. *J Polym. Sci. B: Polymn. Phys.* 46, 640, (2008).
33. Cetinkaya, M., Boduroglu, S., Demirel, M. C. *Polymer* 48, 4130 (2007).
34. Demirel, M. C., Cetinkaya, M., Singh, A., Dressick, W. *J. Adv. Mater.* 19, 4495 (2007).
35. Boduroglu, S., Cetinkaya, M., Dressick, W. J., Singh, A., Demrirel, M. C., *Latigmuir* 23, 11391 (2207).
36. Demirel, M. C., *Coll. Surf.* A, in press (2008).
37. Malvadkar N., Park, S., Macdonald, M., Wang, H., Demirel, M. C., *J. Power Sources*, in press (2008).
38. Mangan, A., Boduroglu, S., Wang, H., Demirel, M. C., *J. Appl. Polym. Sci.*, submitted for publication (2008).

What is claimed is:
1. A structure, comprising:
    a spatially organized polymer nanostructured thin film on a substrate;
        wherein the film comprises one more assemblies of parallel nanowires or submicron wires inclined at an angle other than a right angle with respect to the substrate; and
    a ligand adsorbate non-covalently attached to the polymer nanostructured thin film;
        wherein the ligand adsorbate is an alkylamine or a nitrogen-containing heterocycle capable of covalently binding to a Pd species; 2,2'-bipyridine; 4,4'-bipyridine; a quinoline; an isoquinoline; 1,10-phenanthroline; a pyridine; pyridine; a benzylamine; benzylamine; a phenylphosphonic acid; a phenol; thiophenol; a phenylboronic acid; or a pyridylboronic acid; or the ligand adsorbate binds a catalyst species comprising a chemical compound or a colloidal particle containing at least a Pd species.
2. The structure of claim 1, wherein the thin film is made by a method comprising:
    directing a monomer vapor or pyrolyzed monomer vapor towards the substrate at an angle other than perpendicular to the substrate; and
    polymerizing the monomer or pyrolyzed monomer on the substrate.
3. The structure of claim 2;
    wherein the monomer is a [2.2]-cyclophane or dichloro-[2.2]-cyclophane; and
    wherein the monomer is vapor-phase pyrolyzed to form a poly-p-xylylene on the substrate.
4. The structure of claim 1, wherein the polymer is a polyimide, a polyphenylene vinylene, poly(trifluoroacetyl-p-xylylene), poly(bromo-p-xylylene), poly(amino-p-xylylene).
5. The structure of claim 1, wherein the ligand adsorbate is an alkylamine or a nitrogen-containing heterocycle capable of covalently binding to a Pd species; 2,2'-bipyridine; 4,4'-bipyridine; a quinoline; an isoquinoline; 1,10-phenanthroline; a pyridine; a benzylamine; a phenylphosphonic acid; a phenol; thiophenol; a phenylboronic acid; or a pyridylboronic acid.
6. The structure of claim 1, wherein the ligand adsorbate is pyridine or benzylamine.
7. The structure of claim 1, wherein the ligand adsorbate binds a catalyst species comprising a chemical compound or a colloidal particle containing at least a Pd species.
8. The structure of claim 1, further comprising:
    one or more additional layers or nanoparticles overlaying the ligand adsorbate.

9. The structure of claim 8;
wherein one or more of the one or more additional layers or nanoparticles comprises Ni; and
wherein the ligand adsorbate is an alkylamine or a nitrogen-containing heterocycle.

10. The structure of claim 8;
wherein one or more of the one or more additional layers or nanoparticles comprises a metal; Ni, Cu, Au, Ag, Co, Fe, Re, W, Mo, Ti, Al, or alloys thereof; an oxide; a ceramic material; or silica, titania, ceria, zirconia, alumina, or mixtures thereof; and
wherein the ligand adsorbate is an alkylamine, a nitrogen-containing heterocycle, or thiophenol.

11. The structure of claim 8, wherein one or more of the one or more additional layers or nanoparticles penetrates into the polymer nanostructured thin film.

12. The structure of claim 8, wherein one or more of the one or more additional layers or nanoparticles comprises a sugar; a polysaccharide; a peptide; a protein; a DNA; a lipid; or a cell.

13. A structure, comprising:
a spatially organized polymer nanostructured thin film on a substrate;
wherein the film comprises one more assemblies of parallel nanowires or submicron wires inclined at an angle other than a right angle with respect to the substrate;
a ligand adsorbate attached to the polymer nanostructured thin film;
wherein the ligand adsorbate is an alkylamine or a nitrogen-containing heterocycle; and
one or more additional layers or nanoparticles overlaying the ligand adsorbate;
wherein one or more of the one or more additional layers or nanoparticles comprises Ni.

14. A method for forming a structure, the method comprising:
providing a spatially organized polymer nanostructured thin film on a substrate and a ligand adsorbate;
wherein the film comprises one more assemblies of parallel nanowires or submicron wires inclined at an angle other than a right angle with respect to the substrate; and
wherein the ligand adsorbate is an alkylamine or a nitrogen-containing heterocycle capable of covalently binding to a Pd species; 2,2'-bipyridine; 4,4'-bipyridine; a quinoline; an isoquinoline; 1,10-phenanthroline; a pyridine; pyridine; a benzylamine; benzylamine; a phenylphosphonic acid; a phenol; thiophenol; a phenylboronic acid; or a pyridylboronic acid; or the ligand adsorbate binds a catalyst species comprising a chemical compound or a colloidal particle containing at least a Pd species; and
adsorbing the ligand adsorbate non-covalently onto the thin film.

15. The method of claim 14, further comprising:
directing a monomer vapor or pyrolyzed monomer vapor towards the substrate at an angle other than perpendicular to the substrate; and
polymerizing the monomer or pyrolyzed monomer on the substrate to form the spatially organized polymer nanostructured thin film.

16. The method of claim 15;
wherein the monomer is a [2.2]-cyclophane or dichloro-[2.2]-cyclophane; and
wherein the monomer is vapor-phase pyrolyzed to form a poly-p-xylylene on the substrate.

17. The method of claim 14, wherein the polymer is a polyimide or a polyphenylene vinylene.

18. The method of claim 14, wherein the ligand adsorbate is an alkylamine or a nitrogen-containing heterocycle capable of covalently binding to a Pd species; 2,2'-bipyridine; 4,4'-bipyridine; a quinoline; an isoquinoline; 1,10-phenanthroline; a pyridine; a benzylamine; a phenylphosphonic acid; a phenol; a naphthol; a phenylboronic acid; or a pyridylboronic acid.

19. The method of claim 14, wherein the ligand adsorbate is pyridine or benzylamine.

20. The method of claim 14, further comprising:
binding a Pd catalyst to the ligand adsorbate adsorbed onto the thin film.

21. The method of claim 14, further comprising:
depositing one or more additional layers or nanoparticles overlaying the ligand adsorbate.

22. The method of claim 21;
wherein one or more of the one or more additional layers or nanoparticles comprises Ni; and
wherein the ligand adsorbate is an alkylamine or a nitrogen-containing heterocycle.

23. The method of claim 21;
wherein one or more of the one or more additional layers or nanoparticles comprises a metal; Ni, Cu, Au, Ag, Co, Fe, Re, W, Mo, Ti, Al, or alloys thereof; an oxide; a ceramic material; or silica, titania, ceria, zirconia, alumina, or mixtures thereof; and
wherein the ligand adsorbate is an alkylamine, a nitrogen-containing heterocycle, or thiophenol.

24. The method of claim 21, wherein one or more of the one or more additional layers or nanoparticles comprises a sugar; a polysaccharide; a peptide; a protein; a DNA; a lipid; or a cell.

25. The method of claim 14, further comprising:
exposing the thin film to a pyridine solution or vapor;
exposing the thin film to a Pd catalyst; and
exposing the thin film to an electroless Ni bath.

26. A method for forming a structure, the method comprising:
providing a spatially organized polymer nanostructured thin film on a substrate and a ligand adsorbate;
wherein the film comprises one more assemblies of parallel nanowires or submicron wires inclined at an angle other than a right angle with respect to the substrate;
adsorbing the ligand adsorbate onto the thin film;
wherein the ligand adsorbate is an alkylamine or a nitrogen-containing heterocycle; and
depositing one or more additional layers or nanoparticles overlaying the ligand adsorbate;
wherein one or more of the one or more additional layers or nanoparticles comprises Ni.

* * * * *